United States Patent
Purcell et al.

(10) Patent No.: US 11,926,199 B2
(45) Date of Patent: Mar. 12, 2024

(54) VERTICAL LIFT DOOR FOR VEHICLES

(71) Applicant: Arctic Cat Inc., Thief River Falls, MN (US)

(72) Inventors: Lucas Grant Purcell, Grand Forks, ND (US); Christopher Joseph Evans, Warren, MN (US)

(73) Assignee: Arctic Cat Inc., Thief River Falls, MN (US)

( * ) Notice: Subject to any disclaimer, the term of this patent is extended or adjusted under 35 U.S.C. 154(b) by 29 days.

(21) Appl. No.: 17/735,960

(22) Filed: May 3, 2022

(65) Prior Publication Data

US 2023/0356573 A1    Nov. 9, 2023

(51) Int. Cl.
  *B60J 5/04*    (2006.01)
  *E05C 17/30*   (2006.01)

(52) U.S. Cl.
  CPC .............. *B60J 5/0473* (2013.01); *E05C 17/30* (2013.01)

(58) Field of Classification Search
  CPC ........................................... E05C 17/30
  USPC ....... 296/146.13, 146.1, 146.11, 202, 190.11
  See application file for complete search history.

(56) References Cited

U.S. PATENT DOCUMENTS

| | | | | | |
|---|---|---|---|---|---|
| 3,589,069 | A * | 6/1971 | Lecomte | ................ | B60J 5/0472 49/257 |
| 4,615,558 | A * | 10/1986 | Nakamura | ................ | B60J 5/06 292/DIG. 3 |
| 6,676,193 | B1 * | 1/2004 | Hanagan | ................ | E05D 15/00 296/202 |
| 6,820,918 | B1 * | 11/2004 | DeBono | ................ | B60J 5/0472 16/374 |
| 7,503,618 | B2 * | 3/2009 | Geyrhofer | ............. | E05D 15/582 49/226 |
| 7,770,960 | B2 * | 8/2010 | Greenbank | ............ | B60J 5/0472 296/146.12 |
| 10,766,343 | B2 * | 9/2020 | Sullwold | ................... | E05D 1/04 |

(Continued)

FOREIGN PATENT DOCUMENTS

| | | | | |
|---|---|---|---|---|
| AU | 2016208432 A1 * | 8/2016 | .......... | B60G 11/265 |
| CN | 201771320 U | 3/2011 | | |

(Continued)

OTHER PUBLICATIONS

Lambo door Como instalar o amortecedor de forma correta, accessed Feb. 11, 2022, URL <https://www.youtube.com/watch?v=g1YL5fii8MM>.

(Continued)

*Primary Examiner* — Amy R Weisberg
*Assistant Examiner* — Veronica M Shull
(74) *Attorney, Agent, or Firm* — Lowe Graham Jones PLLC (57) ABSTRACT

A door of a vehicle, such as a side-by-side utility vehicle, opens vertically about a door pivot. Opening of the door is facilitated by an actuator that secures to the door behind the door pivot. The actuator may also secure to a door frame behind the door pivot. The door may have a range of motion such that at least a portion of the door is positioned forward of the door pivot when opened. The actuator may be a gas spring that may include damping. The actuator may be mounted between panels of the door and may extend through a slot defined by the door to secure to the door frame.

22 Claims, 7 Drawing Sheets

(56) References Cited

U.S. PATENT DOCUMENTS

| | | | |
|---|---|---|---|
| 2005/0285429 A1* | 12/2005 | Valois | B60J 5/0472 296/146.11 |
| 2008/0079284 A1* | 4/2008 | Moreno | B60J 5/0472 296/146.12 |
| 2010/0024161 A1* | 2/2010 | Wood | E05C 17/30 16/82 |
| 2013/0134738 A1* | 5/2013 | Le Duc | B60J 5/0455 296/146.11 |
| 2014/0217770 A1* | 8/2014 | Hirukawa | E05C 3/22 292/336.3 |

FOREIGN PATENT DOCUMENTS

| | | |
|---|---|---|
| CN | 110539621 A | 12/2019 |
| CN | 113417536 A | 9/2021 |

OTHER PUBLICATIONS

Three (wheeled) electric alternatives to Morgan's EV3 | CarsGuide—OverSteer, accessed Feb. 11, 2022, URL<https://www.carsguide.com.au/oversteer/three-wheeled-electric-alternatives-to-morgans-ev3-65734>.

* cited by examiner

VERTICAL LIFT DOOR FOR VEHICLES

FIELD

This application relates to off-road side-by-side vehicles and, more particularly, to doors for such vehicles.

BACKGROUND

Vehicles known as utility terrain vehicles (UTVs), side-by-sides, and all-terrain vehicles (ATVs) have evolved considerably. Now, side-by-sides, including UTVs provide much of the off-road capabilities of an ATV along with some of the conveniences of an automobile. A typical side-by-side has exterior coverings including a partially enclosed cabin accessible through hinged doors partially covering side openings of the cabin. To preserve the off-road capabilities, such structures should be lightweight and robust while still providing ingress and egress functionality.

SUMMARY

A vehicle includes a chassis having wheels secured thereto and defining a longitudinal direction along which the chassis rolls on the wheels when traveling in a straight line and a vertical direction that is perpendicular to a flat surface when the wheels are supported by the flat surface, the chassis defining a door frame having a forward frame member and a rearward frame member, the forward frame member being positioned closer to a forward end of the chassis along the longitudinal direction than the rearward frame member. A door is positionable within the door frame and secured to the forward frame member by a door pivot, the door pivot defining an axis of rotation substantially perpendicular to the vertical direction. An actuator is secured to the door frame at a first actuator pivot, the actuator being secured to the door at a second actuator pivot, the door pivot being closer to the forward end than the second actuator pivot along the longitudinal direction. The second actuator pivot may be positioned closer to the rearward frame member than the door pivot along the longitudinal direction.

The door has a closed configuration positioned within the door frame and an open configuration in which the door is pivoted outwardly about the door pivot from the door frame relative to the closed configuration. In some embodiments, at least a portion of the door is located closer to the forward end than the door pivot along the longitudinal direction when in the open configuration. The actuator may be an air spring. The air spring may be damped along at least a portion of a range of travel thereof.

A tapered fin may be secured to the rearward frame member. A slot may be defined in the door and sized to receive the tapered fin when door is positioned within the door frame. The door may include an outer panel facing an exterior of the vehicle and an inner panel facing an interior of the vehicle, the actuator being positioned between the outer panel and the inner panel.

A vehicle may include a chassis having wheels secured thereto and defining a forward end and a rearward end. The chassis defines a longitudinal direction along which the vehicle rolls on the wheels when traveling in a straight line. A vertical direction may be defined perpendicular to the longitudinal direction and a transverse direction that is perpendicular to the longitudinal direction and the vertical direction. The vertical direction may be defined such that, when the wheels are supported on a flat surface, the vertical direction is normal to the flat surface. The forward end and rearward end are offset from one another along the longitudinal direction. The chassis defines a door frame having a forward door frame member, a rearward door frame member, and a lower door frame member extending between the forward door frame member and the rearward door frame member. The rearward door frame member and forward door member are offset from one another along the longitudinal direction. A door is positionable within the door frame and secures to the forward door frame member by a door pivot having an axis of rotation substantially perpendicular to the vertical direction and the longitudinal direction. An actuator is secured to the door frame at a first actuator pivot and is secured to the door at a second actuator pivot. The first actuator pivot is closer to the rearward door frame member than the door pivot along the longitudinal direction. The second actuator pivot may be closer to the rearward door frame member than the door pivot along the longitudinal direction.

A latch may be secured to the door and a striker secured to the rearward door frame member. Tthe latch may be configured to secure to the striker when the door is positioned within the door frame. The striker may be oriented substantially parallel to the vertical direction.

The chassis may be a tube frame chassis and the vehicle may be a side-by-side utility vehicle.

BRIEF DESCRIPTION OF THE DRAWINGS

Preferred and alternative examples of the present disclosure are described in detail below with reference to the following drawings.

DETAILED DESCRIPTION

Figure 1A:
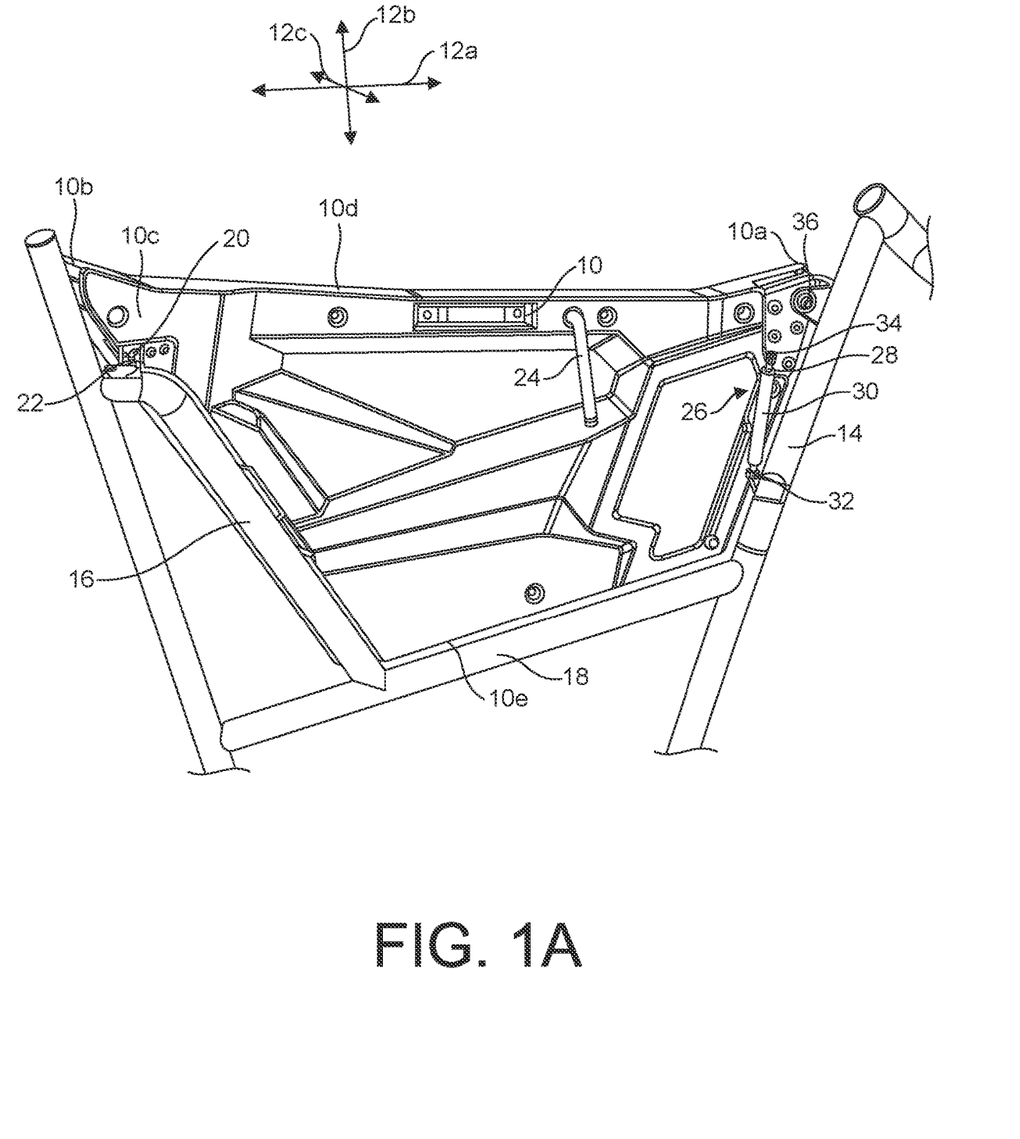
FIG. 1A is an isometric view of a vertical lift door in accordance with an embodiment of the disclosure.
Figure 1B:
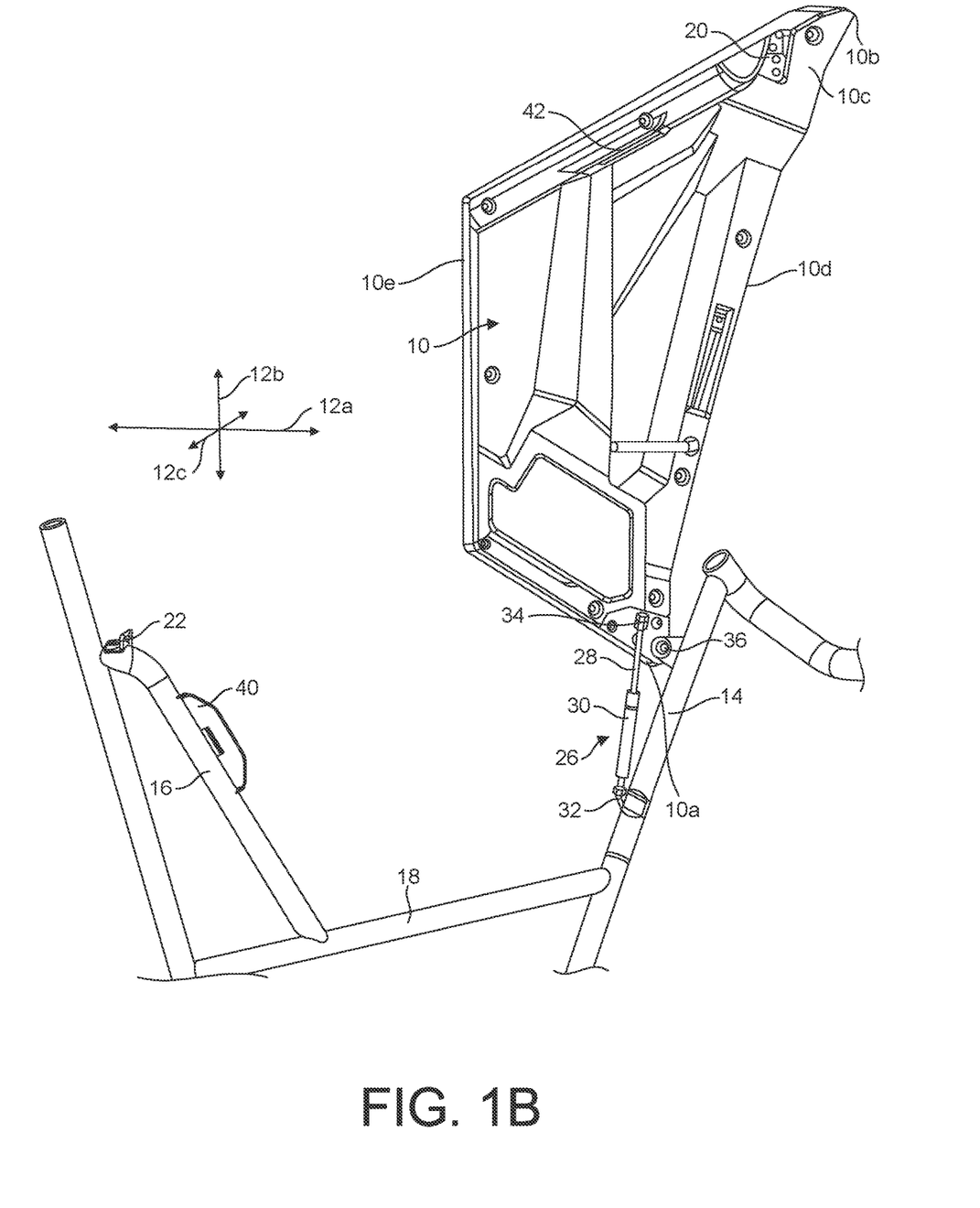
FIG. 1B is an isometric view of the vertical lift door FIG. 1A in an open configuration in accordance with an embodiment of the disclosure.

Referring to FIGS. 1A and 1B, a vertical lift door 10 may be understood with respect to a longitudinal direction 12a, vertical direction 12b, and transverse direction 12c that are all mutually perpendicular to one another. The longitudinal direction 12a may be substantially parallel to a direction of travel of a vehicle incorporating the door 10 when driving in a straight line. The vertical direction 12b may be substantially perpendicular to a flat surface supporting the wheels of the vehicle. As used herein, "substantially" with reference to an angle, e.g., parallel or perpendicular, shall be understood as within 5 degrees of the angle.

The door 10 may include a forward end 10a and a rearward end 10b offset from one another along at least the longitudinal direction 12a. The door 10 may include an upper rearward portion 10c including portion of the door that includes less than all of the door and includes the rearward end 10b. The door 10 may define an upper surface 10d extending between the forward end 10a and the rearward end 10b. The door 10 may also define a lower surface 10e offset from the upper surface 10d along the vertical direction 12b and extending from the forward end 10a to the rearward end 10b.

The door 10 may include a single panel or inner and outer panels connected to one another. The panels may be structural or may be secured to an internal frame, such as a frame made of tubes welded or bolted to one another. Where an internal frame is used, the structures described herein as forming part of the door may secure to the frame of the door 10.

The door 10 may be positioned within an area between a forward frame member 14 and a rearward frame member 16 forming part of a chassis of the vehicle. The forward frame member 14 and rearward frame member 16 may each be mounted to a lower frame member 18. The frame members 14, 16 are at non-perpendicular angles with respect to the longitudinal direction 12a and vertical direction 12b in the illustrated embodiment but may also be either perpendicular or parallel to these directions 12a, 12b. For example, the frame members 14, 16 may be hollow tubes, e.g., round tubes, with the center of the tubes at an angle of between 20 and 80 degrees, between 10 and 50 degrees, or between 5 and 40 degrees, relative to the vertical direction 12b. The angles defined by the frame members 14, 16 may be equal or non-equal to one another. The lower frame member may be a hollow tube with a center of the tube at an angle of between 0 and 30 degrees relative to the longitudinal direction 12a.

As shown in FIG. 1A, the forward frame member 14 extends forwardly from a point of attachment to the lower frame member 18 and the rearward frame member 16 extends rearwardly from a point of attachment to the lower frame member 18. The frame members 14, 16, 18 may be parallel to a plane parallel to the longitudinal direction 12a and vertical direction 12b ("the longitudinal-vertical plane") or may be at a non-parallel angle, e.g., between 0 and 30 degrees with respect to the longitudinal-vertical plane as well.

The door 10 may have a latch 20 secured thereto that engages a striker 22 secured to the rear frame member 16. For example, the latch 20 may be secured to the upper rearward portion 10c. In the illustrated embodiment, the striker 22 is oriented substantially vertically, i.e., a proximal end attached to the rearward frame member 16 and a distal end thereof being offset from one another along a line substantially parallel to the vertical direction 12a. Stated differently, the striker 22 may include straight sections protruding outwardly form the proximal end and these straight sections may be oriented substantially parallel to the vertical direction 12a. Stated differently, the striker 22 may include a cross piece that is grasped by the latch 20 and this cross piece may be oriented substantially parallel to a plane parallel to the longitudinal direction 12a and the transverse direction 12c. The latch 20 may release the striker 22 responsive to actuation of a handle 24 mounted to the door 10. An exterior handle (not shown) mounted to the door 10 may also be actuated to release the latch 20. The latch 20, striker 22, handle 24, and a coupling between the handle 24 and the latch 20 may be implemented according to any approach known in the art of utility vehicles.

The door 10 may be raised by an actuator 26 secured to the door 10 and either the forward frame member 14 or the lower frame member 18. In the illustrated embodiment, the actuator 26 is implemented as a piston 28 and cylinder 30. The piston 28 and cylinder 30 may be embodied as a gas spring that biases the door 10 upwardly and away from the closed configuration of FIG. 1A to the open configuration of FIG. 1B. In the illustrated embodiment, the cylinder 30 is secured to the forward frame member 14, lower frame member 18, or other portion of the chassis of a vehicle and the piston 28 is secured to the door 10. However, this arrangement may be reversed. The piston 28 and cylinder 30 may include damping along a portion of its range of travel, such as at least 2 to 5 cm of travel when moving from the closed configuration to the open configuration. The actuator 26 may have other implementations, such as rod driven by a coil spring rather than gas, such as an electric, pneumatic, or hydraulic actuator, or other type of actuator.

In the illustrated embodiment, the actuator 26 has a first pivotal attachment point 32 to the vehicle frame (e.g., frame member 14 or 18)) and a second pivotal attachment point 34 to the door 10. In some embodiments, one or both of the pivotal attachment points 32, 34 are implemented using ball joints. The door 10 has a pivotal attachment point 36 to the forward frame member 14. The axis of rotation of the pivotal attachment point 36 may be substantially perpendicular to the vertical direction 12b and may also be substantially parallel to, or angled with respect to, the transverse direction 12c. The arrangement of the pivotal attachment points 32, 34, 36 may have some or all of the following attributes:

One or both of the pivotal attachment points 32, 34 of the actuator 26 are behind (closer to the rearward frame member 16 than) the pivotal attachment point 36 of the door 10 to the forward frame member 14 along the longitudinal direction 12a.

The pivotal attachment point 32 of the actuator 26 to the forward frame member 14 is behind the pivotal attachment point 34 of the actuator 26 to the door 10 along the longitudinal direction 12a and below the attachment point 34 along the vertical direction 12b.

The pivotal attachment point 32 may be inboard relative to the attachment point 34 along the transverse direction 12c.

Referring to FIG. 1B, in some embodiments the position of the attachment point 34 of the actuator 26 to the door relative to the attachment point 36 of the door to the forward frame member 14 facilitates opening of the door 10 as shown. The door 10 is pivoted outwardly from the space between the forward frame member 14 and rearward frame member 16 such that at least a portion of the door 10 is forward from the attachment point 36 along the longitudinal direction 12a. For example, the latch 20 may be located forward of the attachment point 36 when the door 10 is in the open configuration. In some embodiments, placing the attachment point 34 behind the attachment point 36 enables the door to be pivoted further without the actuator 26 interfering with the attachment point 36 (e.g. fasteners, pins, and or flanges defining the attachment point 36) or the forward frame member 14. For example, the pivot angle between the closed configuration to the maximum opened configuration may be at least 90 degrees, at least 95 degrees, at least 100 degrees, or at least 110 degrees. As shown in FIG. 1B, the piston 28 may raise the attachment point 34 of the actuator 26 to a position that is above the attachment point 36 when the door 10 is in the open configuration. With the door 10 in the open configuration, the upper rearward portion 10c may be positioned forward of the attachment point 32 along the longitudinal direction 12a. With the door 10 in the open configuration, the upper rearward portion 10c may be positioned forward of the attachment point 34 along the longitudinal direction 12a. With the door 10 in the open configuration, a portion of the lower surface 10e of the door 10 may be substantially perpendicular to the longitudinal direction 12a, such as the portion that interfaces with the lower frame member 18.

Figure 2:
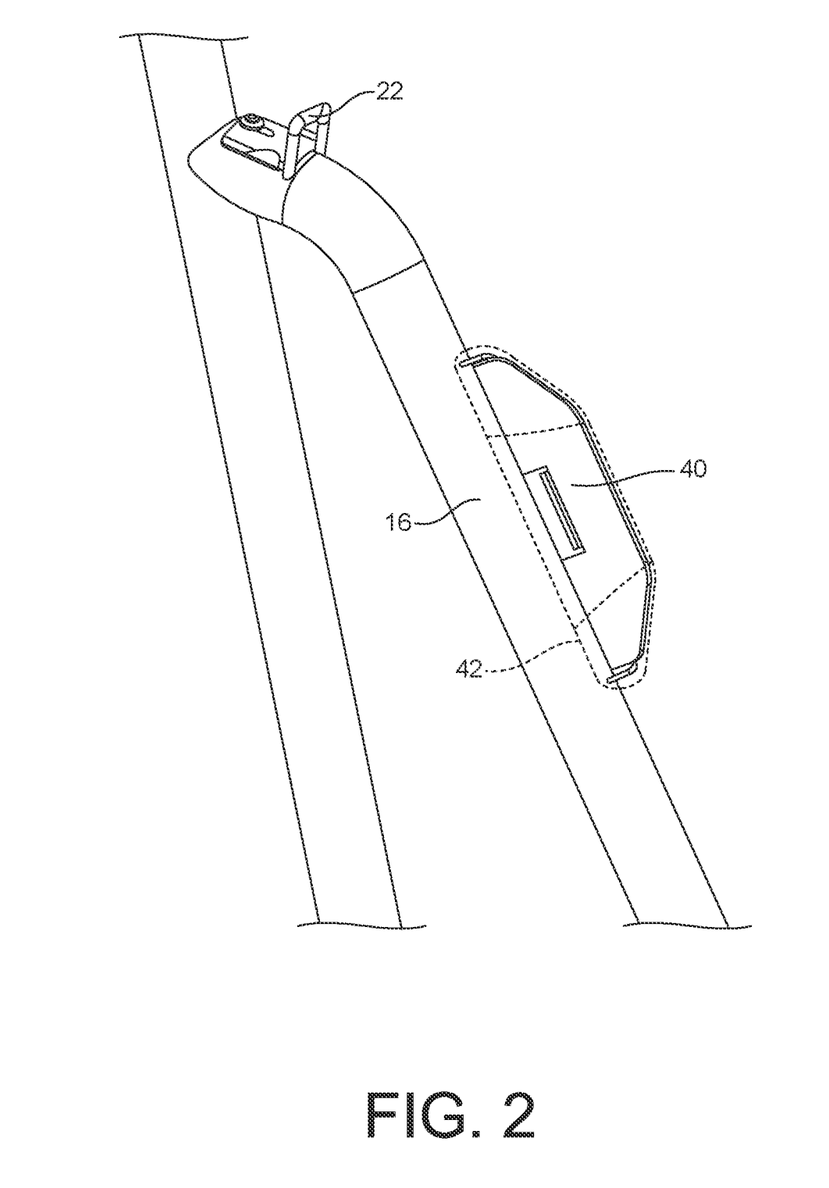
FIG. 2 is an isometric view of an alignment flange in accordance with an embodiment of the disclosure.

Referring to FIG. 2, while still referring to FIG. 1B, an alignment flange 40 may be secured, e.g., welded or bolted, to the rear frame member 16. As the door 10 rotates to the closed configuration, a slot 42 defined by the door 10 may slide over the flange 40. The flange 40 may facilitate alignment of the latch 20 with the striker 22 and also resist flexing of the door 10 outwardly from the lower frame member 18. The flange 40 may be tapered in one or more dimensions. In the illustrated embodiment, the flange 40 is tapered (narrowing with distance from a point of attachment to the frame member 16) in a plane parallel to the plane of rotation of the door about the pivotal attachment point 36. The flange 40 may also be tapered perpendicular to the plane. For example, a cover 42, e.g., plastic or rubber may be secured over the metal flange and be tapered one or both of parallel and perpendicular to the plane. In alternate arrangements the slot and tab may be reversed with the slot on the frame members and the tab on the door.

Figure 3A:
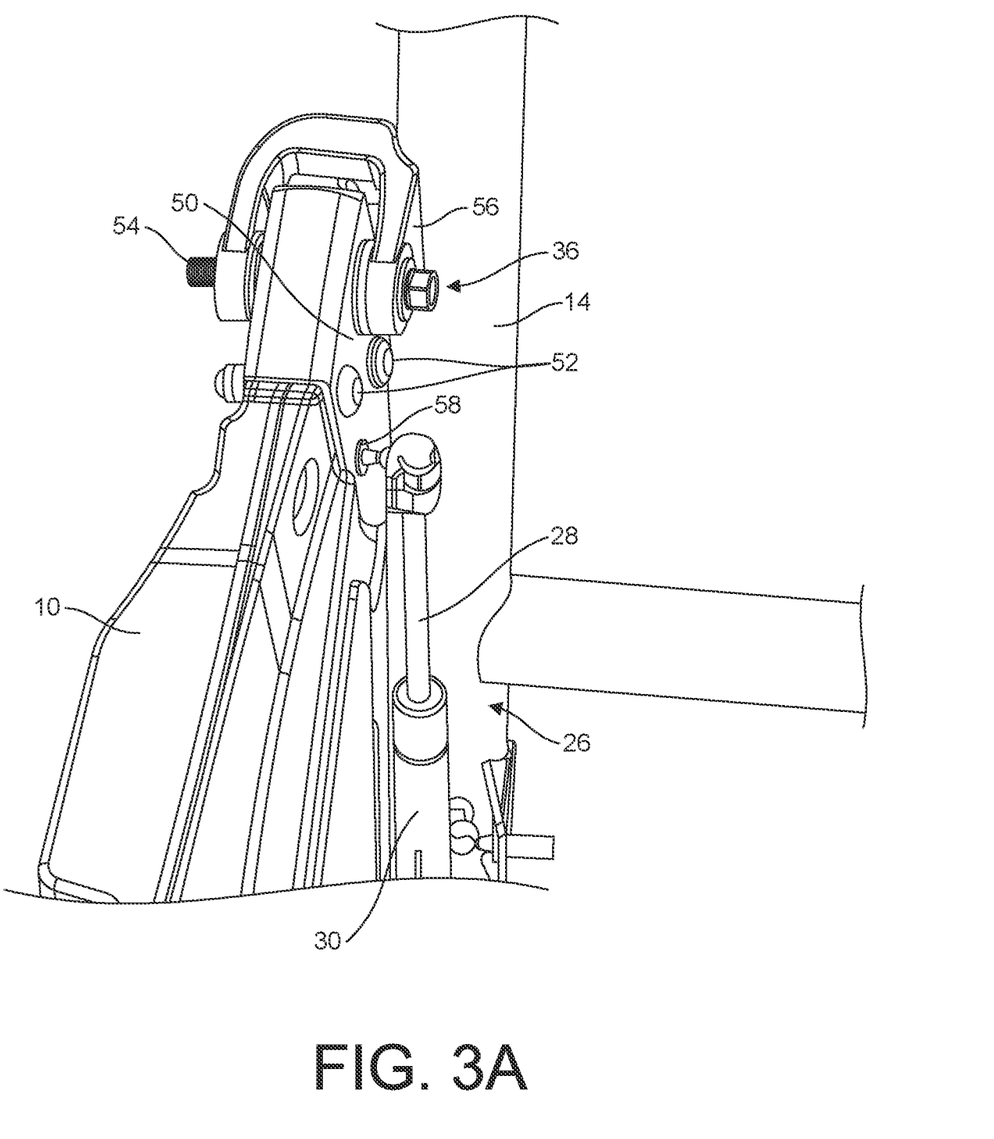
FIG. 3A is an isometric view of a hinge for the vertical lift door of FIG. 1A in accordance with an embodiment of the disclosure.

Referring to FIG. 3A, a mounting bracket 50 may secure to the door 10. The mounting bracket 50 may be U-shaped and extend over both interior and exterior surfaces of the door 10. Where the door 10 includes an internal frame, the mounting bracket 50 may be secured to the internal frame using one or more bolts 52 passing through the mounting bracket 50 and internal frame. In other embodiments the bolts 52 secure the mounting bracket 50 to a panel or panels providing the structural strength of the door 10.

The pivotal attachment point 36 may be defined by a bolt 54 secured to the mounting bracket 50. For example, the bolt 54 may pass completely through the mounting bracket 50. A frame mounting bracket 56 may be secured to the forward frame member 14 and the mounting bracket 50 may be pivotally secured thereto, such as by the bolt 54 passing through both mounting brackets 50, 56. In the illustrated embodiment, the frame mounting bracket 56 is U-shaped such that the mounting bracket 50 is positioned within the frame mounting bracket 56. In the illustrated embodiment, the pivotal attachment point 34 of the actuator 26 to the door 10 is implemented as a fastener 58 securing the actuator 26 to the mounting bracket 50.

As shown in FIG. 3A, the frame mounting bracket 56 may include an inboard side that is secured to an outboard portion of the forward frame member 14 so that the door 10 may pivot from the closed configuration to the open configuration along a plane that is not parallel with a longitudinal axis of the chassis 72. In a non-limiting example, the door 10 may pivot from the closed configuration to the open configuration along the plane so that an upper portion of the rearward end of the door 10 is positioned closer to the longitudinal centerline of the chassis (see element 78 in FIG. 4A) in the open configuration than in the closed configuration. The upper portion of the rearward end of the door 10 may be positioned forward of the pivotal attachment point 32 when the door 10 is in the open configuration. Optionally, the upper portion of the rearward end of the door 10 is positioned forward of the pivotal attachment point 34 when the door 10 is in the open configuration. Optionally, the upper portion of the rearward end of the door 10 is positioned forward of the pivotal attachment point 36 when the door 10 is in the open configuration.

Figure 3B:
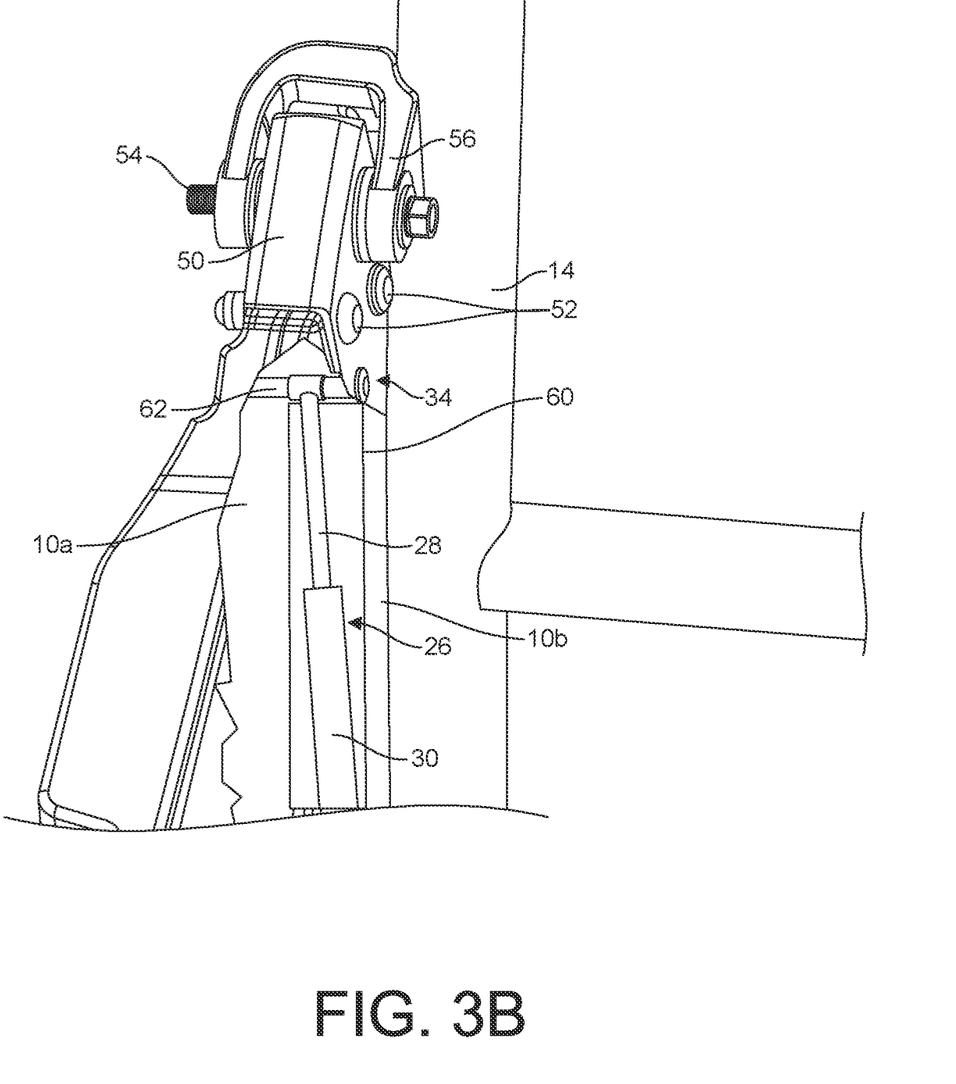
FIG. 3B is an isometric view of the vertical lift door having an internal actuator in accordance with an embodiment of the disclosure.

Referring to FIG. 3B, in some embodiments, the actuator 26 is positioned within the door 10. This may advantageously reduce exposure of the actuator 26 and reduce the footprint of the actuator 26 within the door opening. For example, the door 10 may include an outer panel 10a and an inner panel 10b with the actuator 26 positioned between the panels 10a, 10b. One of the panels 10a, 10b may define a slot 60 or the slot 60 may be defined at a seam between the panels 10a, 10b. The slot 60 may permit the actuator 26 to extend from the pivotal point of attachment 34 to the pivotal point of attachment 32 to the forward frame member 14. The slot 60 may have a length in the plane of rotation of the door 10 sized to enable the full range of travel of the door 10 from the closed configuration to the open configuration as defined above.

In the illustrated embodiment, the pivotal point of attachment 34 may be embodied as a pin 62 passing through the mounting bracket 50 and a portion of the actuator 26, e.g., an eye formed at an end of the piston 28.

Figure 4A:
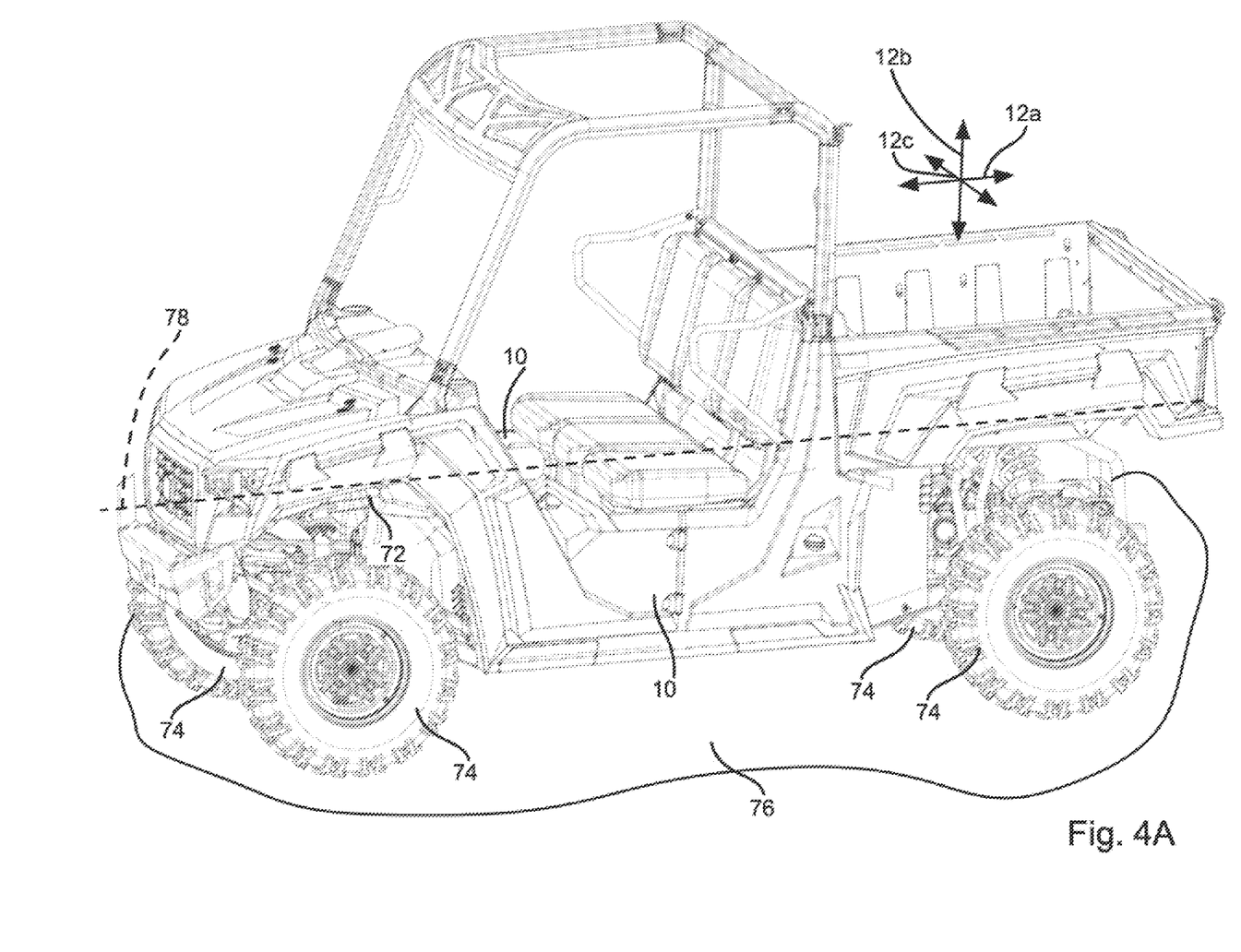
FIG. 4A is an isometric view of a vehicle incorporating the vertical lift door in the closed configuration in accordance with an embodiment of the disclosure.
Figure 4B:
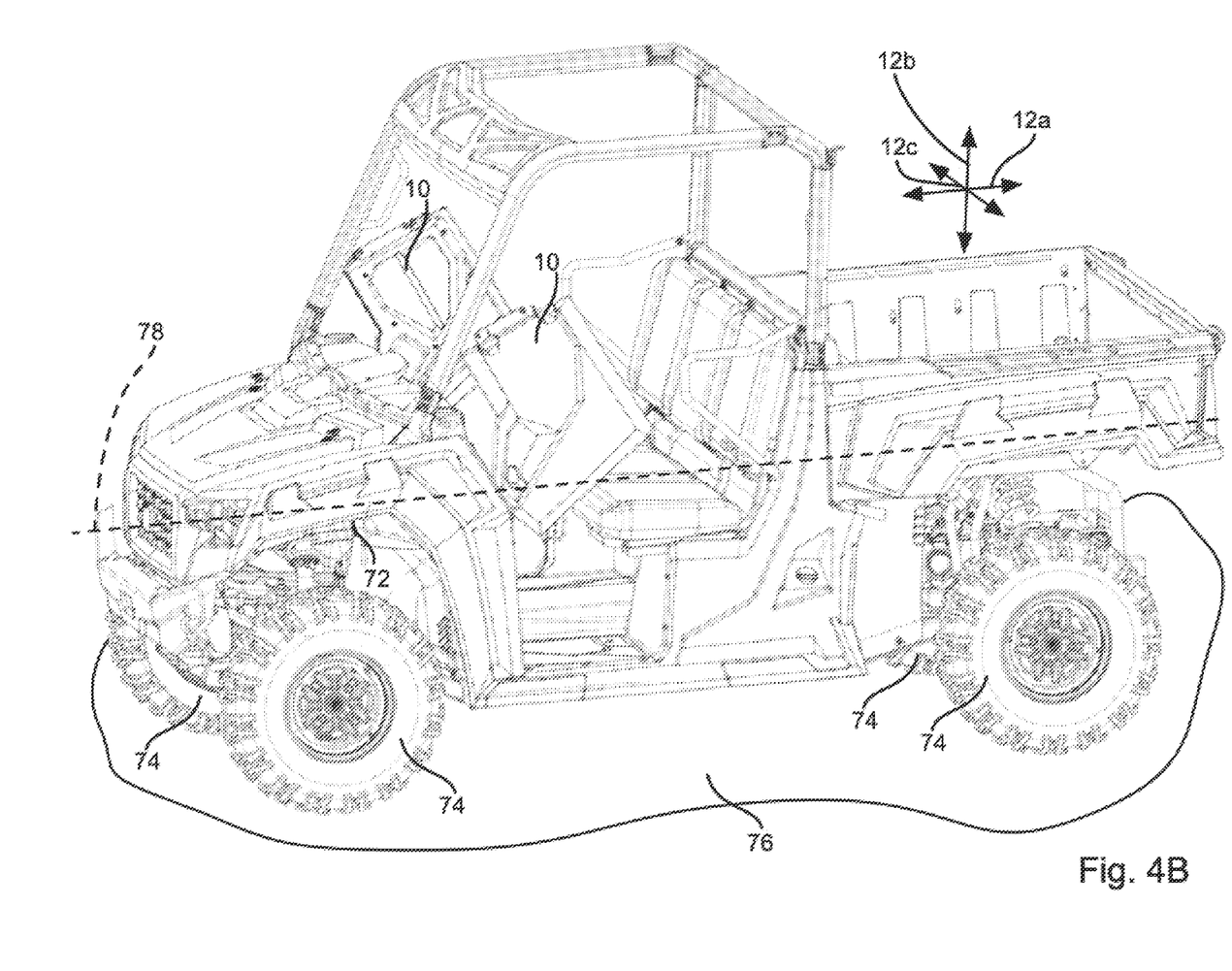
FIG. 4B is an isometric view of the vehicle with the vertical lift door in the open configuration in accordance with an embodiment of the disclosure.

FIGS. 4A and 4B illustrate the door 10 incorporated into a vehicle 70 according to any of the above-described embodiments. The vehicle 70 may be embodied as a side-by-side vehicle having chassis 72 that may be embodied as a tube frame including a roll cage, the tube frame including the frame members 14, 16, 18 around the door 10 when closed as described above. The vehicle 70 may include wheels 74 secured to the chassis and that rest on a support surface 76 supporting the vehicle and defining the longitudinal direction 12a and transverse direction 12c. The chassis 70 may define a longitudinal centerline 78 parallel to the longitudinal direction 12a. A vertical lift door 10 according to any of the embodiments disclosed herein may be incorporated into any vehicle, including road-legal passenger cars.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

What is claimed is:

1. A vehicle comprising:
   a chassis having wheels secured thereto and defining a longitudinal direction along which the chassis rolls on the wheels when traveling in a straight line and a vertical direction that is perpendicular to a flat surface when the wheels are supported by the flat surface, the chassis defining a door frame having a forward frame member and a rearward frame member, the forward frame member being positioned closer to a forward end of the chassis along the longitudinal direction than the rearward frame member;
   a door positionable within the door frame and secured to the forward frame member by a door pivot, the door having an inner side, an outer side, a forward side, and a rearward side, the door pivot defining an axis of rotation substantially perpendicular to the vertical direction;
   an actuator secured to the door frame at a first actuator pivot, the actuator being secured to the door at a second actuator pivot; and
   a tapered elongated fin projecting forwardly from the rearward frame member and a slot defined in the rearward side of the door and sized to receive the tapered fin when door is positioned within the door frame.

2. The vehicle of claim 1, wherein the first actuator pivot is closer to the rearward frame member than the door pivot along the longitudinal direction.

3. The vehicle of claim 1, wherein the fin is a metal flange fixed to the rearward frame member, an upper edge of the flange is tapered to a narrower distance from the rearward frame member at a top end of the flange.

4. The vehicle of claim 1, wherein the door pivot comprises a U-shaped mounting bracket extending over interior and exterior surfaces of the door.

5. The vehicle of claim 1, wherein the actuator is an air spring that is damped along only a portion of a range of travel thereof.

6. The vehicle of claim 3, wherein a lower edge of the flange is tapered to a narrower distance from the rearward frame member at a lower end of the flange.

7. The vehicle of claim 1, wherein the door further comprises an outer panel facing an exterior of the vehicle and an inner panel facing an interior of the vehicle, the actuator being positioned between the outer panel and the inner panel.

8. A vehicle comprising:
a chassis having wheels secured thereto and defining a forward end and a rearward end, the chassis defining a longitudinal direction along which the vehicle rolls on the wheels when traveling in a straight line, a vertical direction perpendicular to the longitudinal direction, and a transverse direction that is perpendicular to the longitudinal direction and the vertical direction, the vertical direction being defined such that, when the wheels are supported on a flat surface, the vertical direction is normal to the flat surface, the forward end and the rearward end being offset from one another along the longitudinal direction, the chassis defining a door frame having a forward door frame member, a rearward door frame member, and a lower door frame member extending between the forward door frame member and the rearward door frame member, the rearward door frame member and forward door member being offset from one another along the longitudinal direction;
a door positionable within the door frame and secured to the forward door frame member by a door pivot having an axis of rotation substantially perpendicular to the vertical direction and the longitudinal direction; and
an actuator secured to the door frame at a first actuator pivot and secured to the door at a second actuator pivot, the first actuator pivot being further rearward than the door pivot along the longitudinal direction, wherein the second actuator pivot is forward of the first actuator pivot in both the fully closed-door configuration and in the fully open-door configuration.

9. A vehicle comprising:
a chassis having wheels secured thereto and defining a forward end and a rearward end, the chassis defining a longitudinal direction along which the vehicle rolls on the wheels when traveling in a straight line, a vertical direction perpendicular to the longitudinal direction, and a transverse direction that is perpendicular to the longitudinal direction and the vertical direction, the vertical direction being defined such that, when the wheels are supported on a flat surface, the vertical direction is normal to the flat surface, the forward end and the rearward end being offset from one another along the longitudinal direction, the chassis defining a door frame having a forward door frame member, a rearward door frame member, and a lower door frame member extending between the forward door frame member and the rearward door frame member, the rearward door frame member and forward door member being offset from one another along the longitudinal direction;
a door positionable within the door frame and secured to the forward door frame member by a door pivot having an axis of rotation substantially perpendicular to the vertical direction and the longitudinal direction; and
an actuator secured to the door frame at a first actuator pivot and secured to the door at a second actuator pivot, the first actuator pivot being further rearward than the door pivot along the longitudinal direction, wherein the second actuator pivot is longitudinally closer to the door pivot in a fully open-door configuration than in a fully closed-door configuration.

10. The vehicle of claim 9, wherein the second actuator pivot is vertically higher than the door pivot in a fully open-door configuration.

11. The vehicle of claim 9, further comprising a tapered elongated fin projecting forwardly from the rearward frame member and a slot defined in the rearward side of the door and sized to receive the tapered fin when door is positioned within the door frame.

12. A vehicle comprising:
a chassis having wheels secured thereto and defining a forward end and a rearward end, the chassis defining a longitudinal direction along which the vehicle rolls on the wheels when traveling in a straight line, a vertical direction perpendicular to the longitudinal direction, and a transverse direction that is perpendicular to the longitudinal direction and the vertical direction, the vertical direction being defined such that, when the wheels are supported on a flat surface, the vertical direction is normal to the flat surface, the forward end and the rearward end being offset from one another along the longitudinal direction, the chassis defining a door frame having a forward door frame member, a rearward door frame member, and a lower door frame member extending between the forward door frame member and the rearward door frame member, the rearward door frame member and forward door member being offset from one another along the longitudinal direction;
a door positionable within the door frame and secured to the forward door frame member by a door pivot having an axis of rotation substantially perpendicular to the vertical direction and the longitudinal direction;
an actuator secured to the door frame at a first actuator pivot and secured to the door at a second actuator pivot, the first actuator pivot being further rearward than the door pivot along the longitudinal direction;
a latch secured to the door; and
a striker secured to the rearward door frame member at an upper end thereof, the latch configured to secure to the striker when the door is positioned within the door frame, wherein the striker is oriented substantially parallel to the vertical direction.

13. The vehicle of claim 12, wherein the door further comprises an outer panel facing an exterior of the vehicle and an inner panel facing an interior of the vehicle, the actuator being positioned between the outer panel and the inner panel.

14. The vehicle of claim 12, wherein the chassis is a tube frame chassis and wherein a fin projects forwardly from a forward side of the rearward door frame member.

15. The vehicle of claim 14, further comprising a slot defined in the rearward side of the door and sized to receive the fin when the door is in a closed position within the door frame.

16. A vehicle comprising:
a chassis having wheels secured thereto and defining a longitudinal centerline, the chassis defining a door frame including a forward frame member and a rearward frame member; a door defining a forward end and a rearward end, the forward end of the door is secured to the forward frame member by a door pivot and the rearward end is positioned adjacent the rearward frame member when the door is in a closed position; and
an actuator secured to the door frame at a first actuator pivot, and the actuator is secured to the door at a second actuator pivot that is vertically below the door pivot and longitudinally forward of the first actuator pivot when the door is positioned in a closed configuration such that the actuator extends forwardly and upwardly from the frame securement to the door securement.

17. The vehicle of claim 16, wherein the second actuator pivot point is positioned rearward of the first actuator pivot point along the longitudinal centerline.

18. The vehicle of claim 17, wherein an upper portion of the rearward end of the door is positioned forward of the second actuator pivot point when the door is in an open position.

19. The vehicle of claim 18, wherein the upper portion of the rearward end of the door is positioned forward of the first actuator pivot point when the door is in the open position.

20. The vehicle of claim 16, wherein the door defines an upper surface and a lower surface, wherein the upper surface and the lower surface of the door extend from the forward end of the door to the rearward end of the door, and wherein a portion of the lower surface is positioned substantially perpendicular to the longitudinal centerline of the chassis when the door is in an open position, and wherein the lower surface of the door slopes upwardly from rear to front when the door is in a closed configuration.

21. The vehicle of claim 16, further comprising a tapered fin secured to the rearward door frame member and a slot defined in the door and sized to receive the tapered fin when door is positioned within the door frame.

22. The vehicle of claim 16, further comprising:
a latch secured to the door; and
a striker secured to the rearward door frame member at an upper end thereof, the latch configured to secure to the striker when the door is positioned within the door frame, wherein the striker is oriented substantially parallel to the vertical direction.

\* \* \* \* \*